No. 654,803. Patented July 31, 1900.
S. G. REYNOLDS.
TROLLEY WHEEL.
(Application filed Dec. 11, 1899.)
(No Model.)
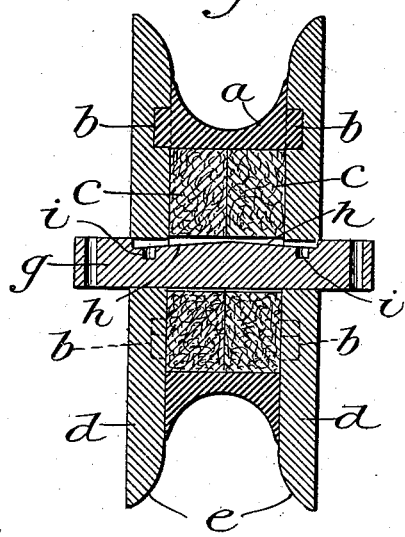
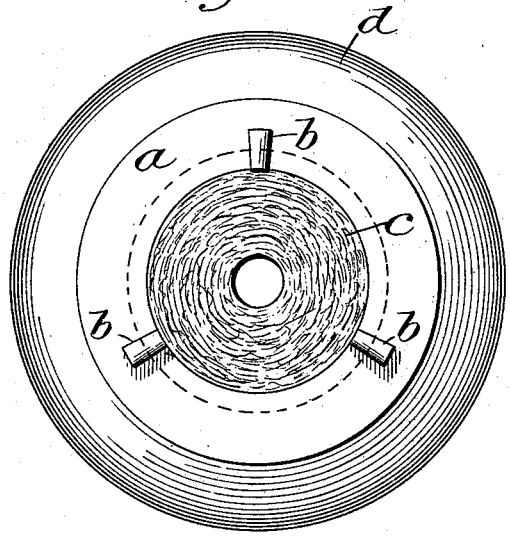 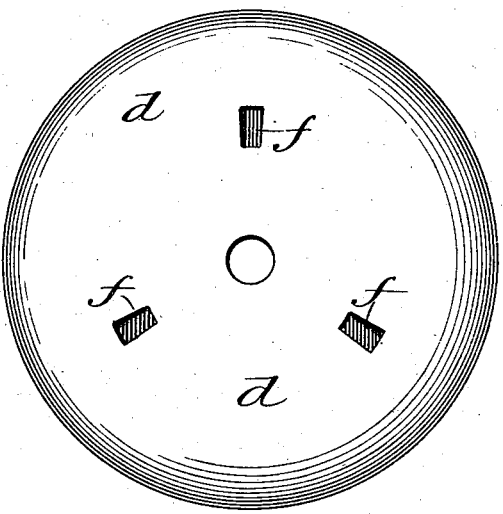
Witnesses:
D. W. Edelin.
A. E. Grant.
Inventor:
S. G. Reynolds
By his attorney
Pennie & Goldsborough

UNITED STATES PATENT OFFICE.

STEPHEN GIRARD REYNOLDS, OF EASTON, PENNSYLVANIA, ASSIGNOR OF ONE-HALF TO NAT FREEMAN, OF SAME PLACE.

TROLLEY-WHEEL.

SPECIFICATION forming part of Letters Patent No. 654,803, dated July 31, 1900.

Application filed December 11, 1899. Serial No. 739,985. (No model.)

*To all whom it may concern:*

Be it known that I, STEPHEN GIRARD REYNOLDS, a citizen of the United States, residing at Easton, in the county of Northampton and State of Pennsylvania, have invented certain new and useful Improvements in Trolley-Wheels; and I do hereby declare the following to be a full, clear, and exact description of the invention, such as will enable others skilled in the art to which it appertains to make and use the same.

With the object in view to provide a strong, simple and efficient construction of trolley-wheel the invention consists of a wheel consisting of a center cored out to receive a felt or other packing and removable side disks, said center and disks having interlocking projections and indentations and the whole provided with an axial pin adapted to be locked, by means of cotters or otherwise, within the jaws of the fork at the upper end of the trolley-pole.

The construction is illustrated in the accompanying drawings, wherein—

Figure 1 is a central section; Fig. 2, a side view with one of the disks removed; Fig. 3, an inner side view of the disk, and Fig. 4 a plan view of the pin.

Referring to the views, $a$ indicates the center of the wheel. It is preferably made of copper or aluminium and consists of an annular ring grooved on its periphery, as shown in Fig. 1, and having a hollow center, as illustrated in Figs. 1 and 2. On the sides of this wheel are radial lugs or teeth $b$, preferably three in number, projecting in the line of the axis, and within the hollow center is a felt or other fibrous packing $c$. The sides of the wheel are composed of disks $d$, which are of considerably-greater diameter than the center $a$ and preferably have flaring edges $e$. At suitable distances from the centers of these disks they are provided on their inner faces with radial indentations $f$, corresponding in number and location with the teeth or lugs $b$ on the center $a$. There is thus provided an interlocking engagement between the center and the side disks of the wheel which holds the parts firmly together and forms a simple, strong, and solid connection. The wheel turns upon the pin $g$, which is preferably constructed, as illustrated in Figs. 1 and 4, with flattened portions $h$ on its top side inclining downwardly toward opposite ends from a central point and provided near the ends of the flattened inclines with depressions $i$. The pin fits snugly in central openings in the side disks $d$; but the center $a$ has no bearing upon it. The pin being locked in any suitable way in the jaws of the pole-fork and the packing $c$ being saturated with any suitable lubricating-oil, the interior of the wheel and its bearings are sealed dust-proof, it being understood that the side disks are imperforate and that the jaws of the fork hold the disks firmly against the center $a$. The flattened inclines $h$ direct the oil outwardly toward the bearings of the disks and into the recesses $i$, where a supply accumulates at the point where most needed.

The construction being as thus described, what I claim, and desire to secure by Letters Patent, is—

1. A trolley-wheel, having, in combination, a peripherally-grooved annular center provided with integral lateral projections, side disks having interlocking indentations or depressions on their inner sides corresponding in number and position with the projections, whereby said disk and center are locked against relative rotary movement and a pin on which the side disks have their bearings.

2. A trolley-wheel, having, in combination, the peripherally-grooved annular center $a$, provided on its outer edges with the integral radial lugs or teeth $b$, the side disks $d$, having radial interlocking indentations or depressions $f$, corresponding in number and location with the lugs or teeth, and the pin $g$, adapted to fit in bearings in the side disks.

3. A trolley-wheel having, in combination, the peripherally-grooved, annular center ring $a$, having radial lugs or teeth projecting laterally from its opposite edges, the side disks $d$, having radial indentations or depressions $f$, corresponding in number and location with the teeth on the center ring, the fibrous packing $c$, and the pin $g$, adapted to be secured in the fork of the trolley-pole providing a bearing for the disks.

4. A trolley-wheel, having, in combination, a center ring, side disks, and a fibrous packing within the hollow of the ring, and a pin upon which the wheel revolves said pin provided at its top with flattened portions $h$, inclining in opposite directions from a central point.

In testimony whereof I affix my signature in presence of two witnesses.

STEPHEN GIRARD REYNOLDS.

Witnesses:
I. M. WEIL,
CHAS. B. BRUNNER.